Sept. 16, 1958 E. D. LINDBLOM 2,852,227
BLADE RINGS FOR RADIAL FLOW ELASTIC FLUID MACHINES
Original Filed Feb. 27, 1948 2 Sheets-Sheet 1
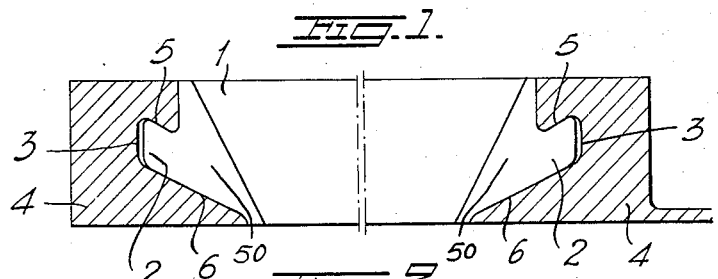
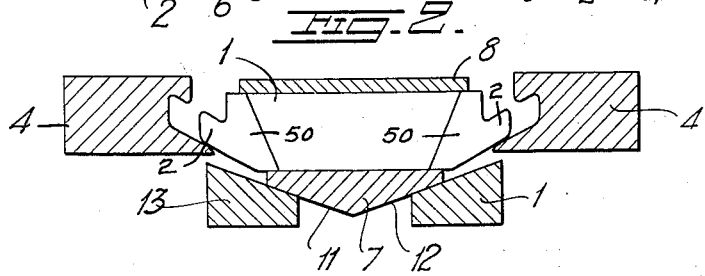
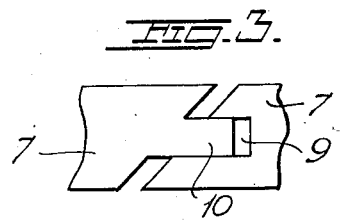
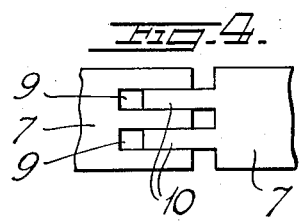
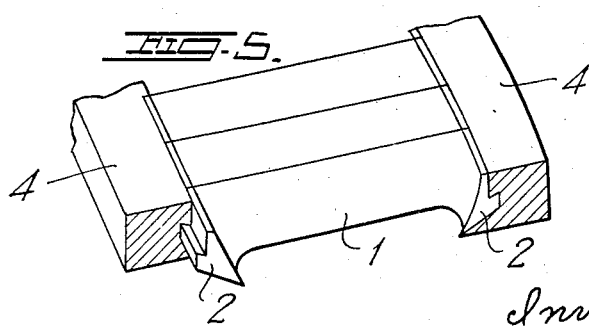
Inventor
Erik David Lindblom
by Sommers & Young
Attorneys

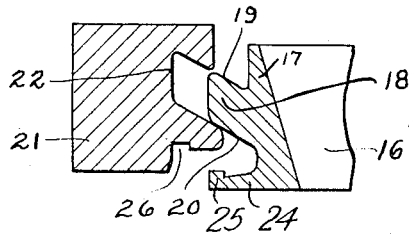
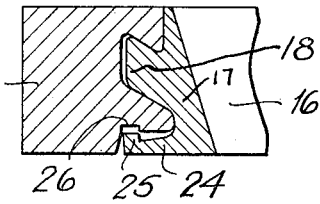
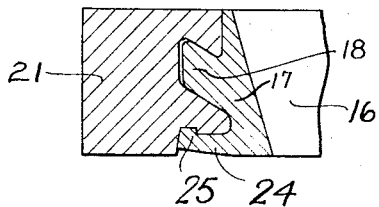
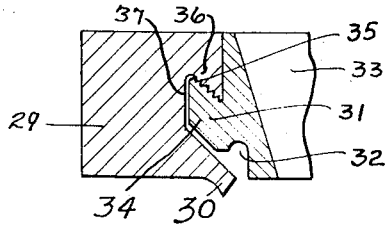

2,852,227
Patented Sept. 16, 1958

2,852,227

BLADE RINGS FOR RADIAL FLOW ELASTIC FLUID MACHINES

Erik David Lindblom, Finspong, Sweden, assignor to Svenska Turbinfabriks Aktiebolaget Ljungström, Finspong, Sweden, a Swedish joint-stock company Original application February 27, 1948, Serial No. 11,456. Divided and this application October 25, 1950, Serial No. 191,993

Claims priority, application Sweden October 17, 1947

2 Claims. (Cl. 253—77)

This application is a division of my prior application Serial No. 11,456, filed February 27, 1948, now abandoned, for Method of Manufacturing Blade Rings for Radial Flow Elastic Fluid Machines.

The present invention relates to blade rings for radial flow elastic fluid machines and more particularly to blade rings for radial flow elastic fluid turbines and compressors in which a blade ring comprises two or more supporting rings and blades extending therebetween.

The present invention has for its object to provide a blade ring which may be manufactured substantially without the use of any welding as well as without the use of a rolling operation for sealing the supporting rings to the dove tail projections of the blade roots. It is thus possible, according to the invention, to select for the blade rings a material which is considered the best one from strength and corrosion point of view. No compromise need be made in order to satisfy the conditions laid upon the material when welding and rolling operations are to be used.

The invention is characterized, chiefly, by the feature that the profiles of projections formed on the axially outer surfaces of the blade roots and of groove formed in the axially inner surfaces of supporting rings to receive said projections are so shaped as to permit bringing them into a sealed engagement with each by a combined axial and radial movement of blades and supporting rings with relation to each other.

The invention is illustrated in the accompanying drawings, in which:

Fig. 1 is an axial section of part of a blade ring,

Fig. 2 is a section in the same plane, though on a smaller scale, of the blade ring elements before assembling them.

Figs. 3 and 4 are plan views of end portions of adjustable fixing elements,

Fig. 5 is a perspective view on a reduced scale of part of a blade ring according to Fig. 1, and Figs. 6–9 are examples, all in axial sections, of further modifications of the invention including means for strengthening the engagement between the blades and a supporting ring.

With reference to Fig. 1, the numeral 1 designates a blade formed with a root, designated in general by numeral 50, at each of its axial opposite sides and with a projection 2 on the axially outer surface of each of said roots. Each of said projections 2 engage respectively in correspondingly shaped groove 3 formed in the respective adjacent axially inner surfaces of supporting ring 4. In the example shown the circumferentially bounding surfaces 5, 6, of the projections 2 and the circumferentially outer and inner walls of said slots are parallel. A method of connecting and assembling blades and supporting rings provided with such projections and grooves, respectively, is illustrated in Fig. 2. The projections 2 are bounded in radial direction by substantially parallel peripherial surfaces extending in obliquely outward directions with respect to the axis of the blade ring. Similarly, the outer and inner side surfaces of the recesses 3 extend in directions corresponding to those of the corresponding projections.

In Fig. 2 it is presupposed that the blades are held assembled to form an annular set by a clamping device comprising two rings 7 and 8 between which the set of blades is clamped. The ring 7 is slit at one or more points of its circumference, for instance, as shown in Fig. 3 or 4. According to Fig. 3 each slit is made as a slot 9 in one member engaged by a tongue 10 of the other member. By this means the ends of the ring or ring members are guided axially and, in addition, a support is obtained for the blades situated at the joint. The ring 7 is bounded on its inner side, remote from the set of blades, by conical surfaces 11, 12, capable of sliding axially along conical external surfaces of annular members 13 and 14. Owing to the slitting of the ring 7 and the provision of said conical surfaces the diameter of the clamping device may be adjusted, as by moving the annular frusto-conical wedge members 13 and 14 toward or from each other.

The turning of the roots 50 to obtain the desired profiles thereof may be accomplished after the ring 7 is given its correct diameter. Then one or more blades is or are removed to allow a reduction of the diameter of the clamping device by drawing the annular wedge members 13 and 14 farther from each other, so that the finished projections 2, may be introduced into the grooves of the supporting rings 4 by the procedure represented by Fig. 2. The annular members 13 and 14 are then again forced toward each other while at the same time supporting rings 4 are pressed toward each other, so that the diameter of the ring 7 is increased and the roots 2 are caused to slide into the grooves 3 by an axial and radial displacement of blades and supporting rings with relation to each other. The blades are then displaced so as to uniformly distribute themselves around the periphery, and distance pieces are inserted into the grooves between the roots of the blades.

A similar method involves assembling the blades on the adjustable clamping device so that they form a ring of such a diameter that, after the roots 50 are shaped by a turning operation so as to obtain the profile desired while they are still in the clamping device, the roots may be brought into engagement with the grooves of the supporting rings without requiring any decrease of diameter of the clamping rings.

A third method is to collect the blades in a clamping device and shape the roots by turning them while they are held in said clamping device, whereupon the supporting rings 4 are heated to cause a difference of temperature between said members of such a degree with resulting expansion and enlargement of diameter as to allow the shaped roots to be introduced into the grooves when the rings 4 are moved axially together and then leaving the assembly untouched until the temperature is equalized, whereby the roots are caused to engage the grooves by the resulting axial and radial displacement of the set of blades and the supporting rings with relation to each other. Said difference of temperature may be obtained by heating the supporting rings which are then shrunk on the roots, or by cooling the set of blades or by a combined heating of the supporting rings and cooling of the set of blades. By suitable dimensioning a sufficient preliminary tension may be obtained between blade roots and supporting rings after the blade roots have first entered the grooves 3 the drawing of the roots proceeds automatically due to the camming effect of the inclined walls of the grooves and blade roots.

One may also combine the shrink method with the diameter adjustment by means of the adjustable clamping device and insertion of distance pieces.

In all of the methods above indicated it may at times be preferred to subject the inner and/or outer edge of the supporting ring around the shaped root to a slight rolling operation.

The sealing of the blades to the supporting rings according to the methods above described permits the use of a profile of the blade roots and of the grooves in the supporting rings which results in a structure of uniform strength, that is to say, a structure in which the blade root and the supporting edge are of equal strength. Another essential advantage resides in an increased resistance to tensional corrosion obtained by a reduction of concentrated stresses and stresses gradients in the outermost edges of the grooves in the supporting rings.

Hereinbefore, a connection between radial flow blades and supporting rings is described in which the profiles of the blade roots and those of the grooves in the supporting rings are selected with a view to permitting a relative displacement of said roots and rings so as to cause the roots to engage the grooves and lock them to each other by a combined axial and radial movement of blades and supporting rings with relation to each other. If it is desired to strengthen this connection it may be combined with an additional engagement, the essential purpose of which is to improve the sealing of the blades with respect to bending torques resulting from tangential forces. Such torques are produced by the reactive effect of the fluid and the action of centrifugal forces on the blade proper, as the main inertia axes of the blade section form an angle with the radius, and due to occasional stresses, as for instance, due to short circuit and water blows.

Various examples of such strengthened connections are illustrated in Figs. 6-9 on the drawings.

In Figs. 6-8 is shown an embodiment comprising in addition to the normal engagement above described an auxiliary engagement shown in various stages of erection. The blade 16 is formed with a root 17 at the end shown, said root having a profile similar to that of the blade root 50 shown in Fig. 1, that is to say, with projection 18 provided with parallel peripheral surfaces 19 and 20, and the supporting ring 21 is formed with a groove 22 similar to that of grooves 3 shown in Fig. 1. The blade root 17 is provided with an auxiliary projection 24 extending in the longitudinal direction of the blade at the inner edge thereof, said projection 24 having an upturned end to form a flange 25 directed toward the blade root projection 18. Formed in the inner periphery of the supporting ring is a recess to receive the projection 24 with a special groove 26 to receive the flange 25. Fig. 6 illustrates the supporting ring 21 and the blade root 17 in a relative position prior to the assembling thereof, and Fig. 8 illustrates the relative position of the blade root 17 and the supporting ring 21 after completed assembling. The projection 24 and especially the end 25 thereof may be subjected to a rolling, pressing or other action in order to cause the flange 25 to engage the groove 26, as shown in Fig. 8. Alternatively, the projection 24 may be formed without a flange such as flange 21, in which case the projection may be welded to the supporting ring as indicated in Fig. 9a. In the embodiment shown in Fig. 9 the supporting ring 29 is provided with an outwardly bent edge 30 at its inner periphery, said edge being connected to the root 31 of blade 33 by a rolling operation and/or other locking operation, so as to cause the edge 30 to engage a groove 32 in the radially inner face of blade root at the base of projection 34. The radially outer surface 35 of projection 34 is serrated as is also the radially inner surface of groove 37 in order to oppose tangentially or radially acting torques.

The assembling of the blades and the supporting rings may be effected in any of the methods described with reference to Figs. 1-6.

In the embodiment shown in Fig. 9 the supporting ring 4 is provided with an inwardly directed flange 31 engaging a groove in the blade root 2. In order that the blade root and, irrespective of this flange, be introduced into the groove of the supporting ring the width of said groove should be increased by an amount depending on the radial length of flange 31. After the blade roots are connected with the supporting ring, a sealing ring 32 is inserted, as by caulking, into the groove at the inner side of the blade roots whereupon the connection may be finished by compressing the edge 33 so as to bear against the exposed edge of ring 32. By this means a bayonet seal is obtained.

I claim:

1. A blade ring for radial flow elastic fluid machines comprising in combination, at least one annular set of axially extending blades, each of said blades having roots at their opposite sides, at least two rings located respectively, at the axial sides of said blades and supporting said blades, a projection on each axially outer side of said roots, said projections being bounded in radial directions by parallel peripheral surfaces extending in obliquely outward directions with respect to the axial extent of the respective blades, said supporting rings being formed on their sides facing said blades with annular recesses receiving said projections and locking them against axial displacement with relation to the supporting rings, the radially inner and outer surfaces of said recesses extending in obliquely outward directions corresponding to said parallel surfaces of the projections of the respective roots of the assembled set of blades whereby the projections of the blade roots are insertable in said recesses by a combined axial and radial relative movement of the blades and the supporting rings.

2. A blade ring as claimed in claim 1, and in which said supporting rings are each formed with a flange at its inner radial periphery, said blade roots being formed with a recess in their inner radial peripheral surfaces for receiving said flange when brought into engagement therewith by a rolling action.

References Cited in the file of this patent

UNITED STATES PATENTS

| | | |
|---|---|---|
| 855,134 | Risbridger | May 28, 1907 |
| 876,422 | Zvonicek | Jan. 14, 1908 |
| 1,571,157 | McCall | Jan. 26, 1926 |
| 1,740,800 | Wiberg | Dec. 24, 1929 |
| 1,916,175 | Lysholm | June 27, 1933 |
| 2,096,079 | Wettstein | Oct. 19, 1937 |
| 2,224,664 | Bierend | Dec. 10, 1940 |

FOREIGN PATENTS

| | | |
|---|---|---|
| 416,331 | Italy | Nov. 27, 1946 |
| 594,204 | Great Britain | Nov. 5, 1947 |
| 703,778 | Germany | Mar. 15, 1941 |